United States Patent
Kanai et al.

(10) Patent No.: US 7,137,210 B2
(45) Date of Patent: Nov. 21, 2006

(54) MEASURING HEAD

(75) Inventors: Takaaki Kanai, Mitaka (JP); Tomonori Sakaue, Mitaka (JP)

(73) Assignee: Tokyo Seimitsu Co., Ltd., Mitaka (JP)

( * ) Notice: Subject to any disclaimer, the term of this patent is extended or adjusted under 35 U.S.C. 154(b) by 0 days.

(21) Appl. No.: 10/522,600

(22) PCT Filed: Jul. 22, 2003

(86) PCT No.: PCT/JP03/09238

§ 371 (c)(1),
(2), (4) Date: Jan. 26, 2005

(87) PCT Pub. No.: WO2004/011874

PCT Pub. Date: Feb. 5, 2004

(65) Prior Publication Data

US 2006/0042109 A1   Mar. 2, 2006

(30) Foreign Application Priority Data

Jul. 26, 2002 (JP) ............................. 2002-218120
Feb. 12, 2003 (JP) ............................. 2003-033715

(51) Int. Cl.
*G01B 3/00* (2006.01)
*G01B 5/20* (2006.01)

(52) U.S. Cl. ...................................... 33/555.1; 33/550

(58) Field of Classification Search .............. 33/555.1, 33/555.2, 555.3, 550, 552, 549, 783
See application file for complete search history.

(56) References Cited

U.S. PATENT DOCUMENTS

| 5,099,585 A | * | 3/1992 | Liskow | ...................... 33/555.1 |
| 5,230,157 A | * | 7/1993 | Ota et al. | ................... 33/555.1 |
| 2006/0026853 A1 | * | 2/2006 | Trionfetti | ...................... 33/552 |

FOREIGN PATENT DOCUMENTS

| JP | 62-119402 | 5/1987 |
| JP | 2002-181502 | 6/2002 |
| WO | WO 99/47883 | 9/1999 |

* cited by examiner

*Primary Examiner*—Yaritza Guadalupe-McCall
(74) *Attorney, Agent, or Firm*—David S. Safran

(57) ABSTRACT

According to the measuring head, the zero point and the amount of front travel settings are facilitated. Firstly, the amount of front travel is set by allowing contacts 34, 34 to abut a master 50. Then, rotating the lever 42 in a direction indicated by an arrow E, or a close position, causes the bearing member 36 to be fastened to the swinging support shaft 28. At this time, a restoring force, or a force caused by reaction, of the bearing member 36 transferred from the bearing member 36 through the arm 38, cam plate 40 and shaft 48 to the measurement lever 32 causes the measurement lever 32 to deflect by an amount that equals to the amount of front travel, and therefore from the position where the amount of front travel is set to the zero point position. This automatically sets the zero point position.

9 Claims, 9 Drawing Sheets

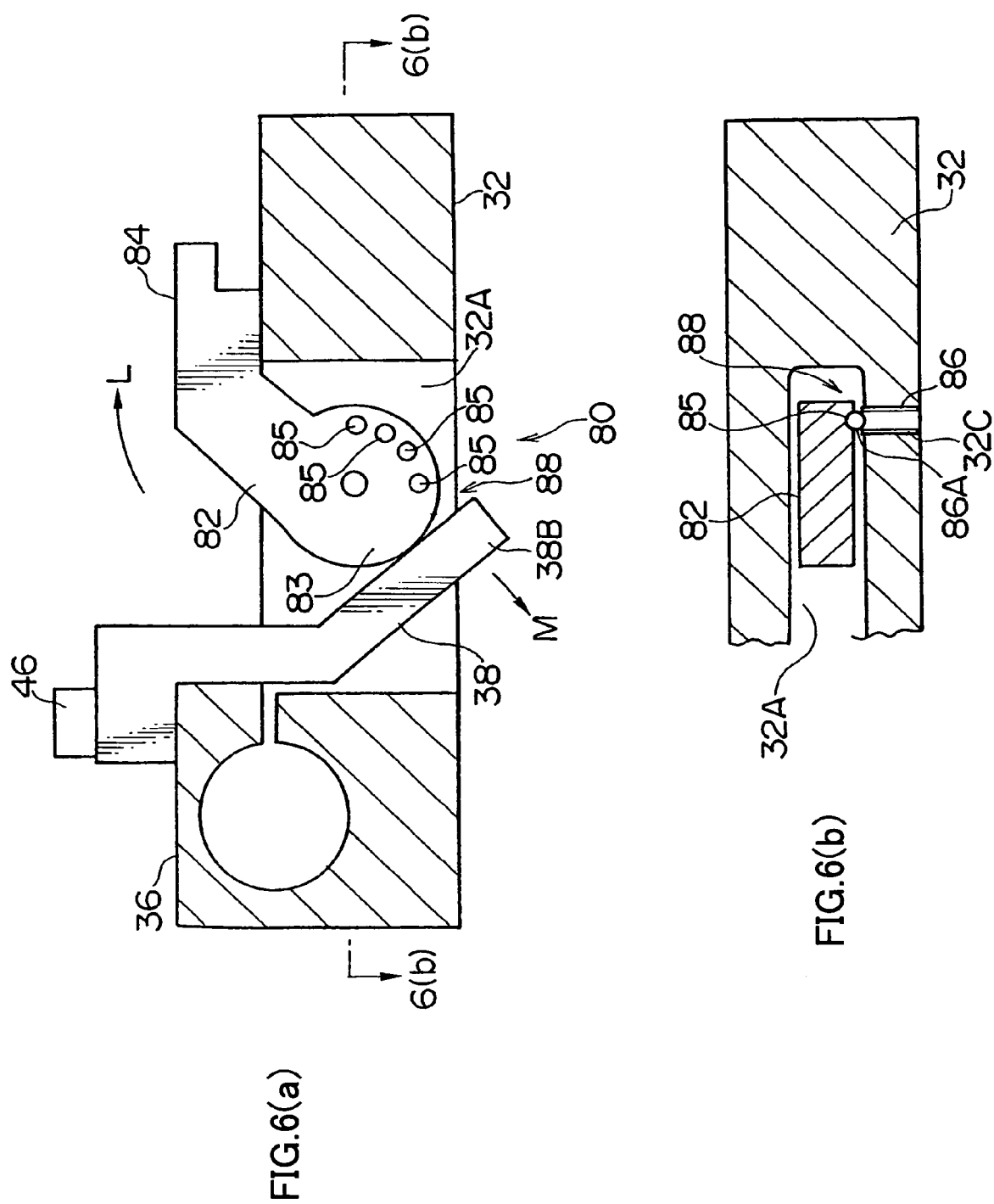

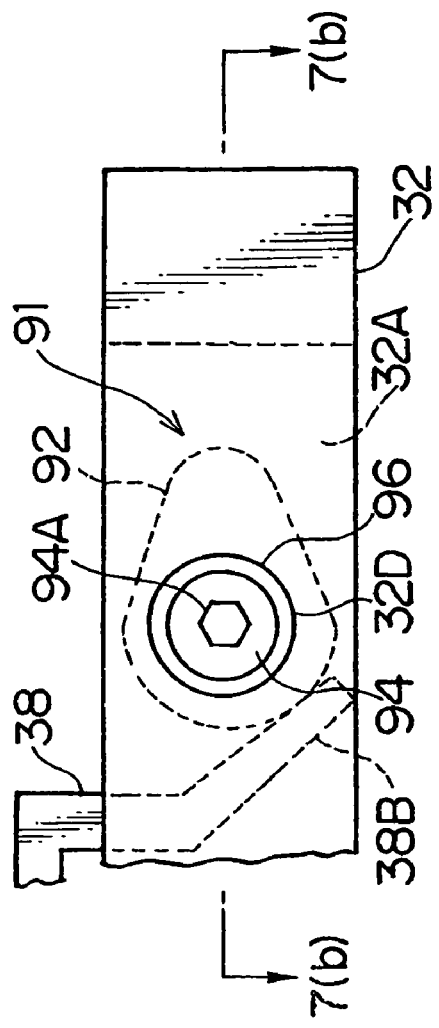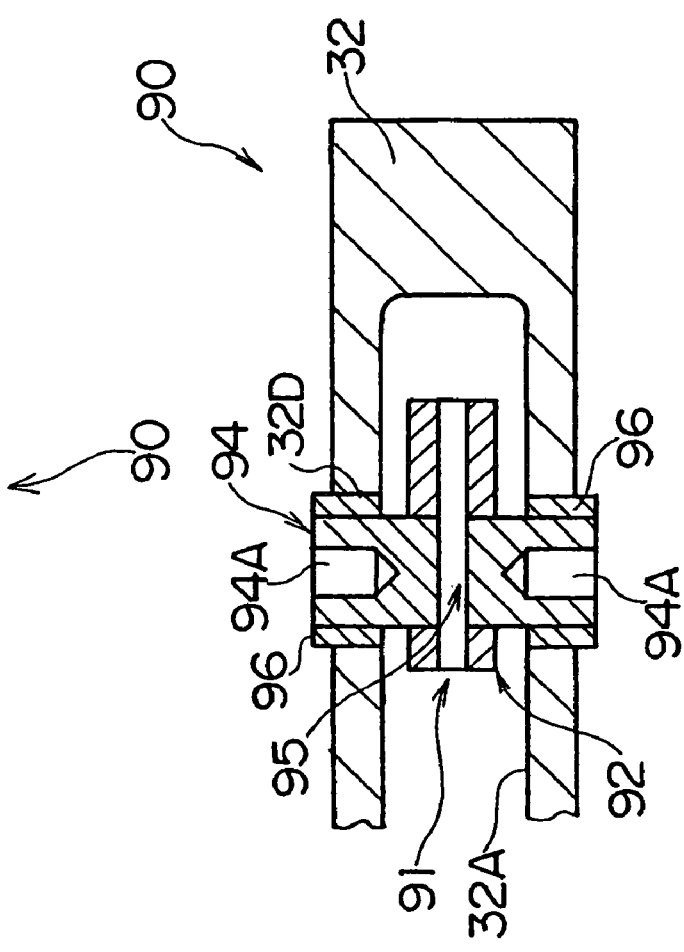

MEASURING HEAD

TECHNICAL FIELD

The present invention relates to a measuring head, and particularly to a measuring head applied to a gauge apparatus for measuring the shape and dimensions of a workpiece during processing and to an inspection and measurement apparatus for measuring the shape and dimensions of a workpiece after the processing.

BACKGROUND ART

Comparative measurement of an outer diameter of a workpiece with a certain design dimension initially requires the zero point adjustment of a detector using a master of the dimension. The zero point adjustment must be made each time the dimensions of the measured workpiece are changed, requiring a large amount of time and effort.

A measuring head disclosed in Japanese Patent Examined Application Publication No. 6-48161, as shown in FIG. 8, is mainly composed of a base lever 2 including a detector 1 at a base end thereof, a measurement lever 3 including a contact 3a at a tip end thereof, a rotatable fulcrum shaft 4 pivotally supporting a tip end of the base lever 2 as well as a base end of the measurement lever 3, a clamp mechanism 5 that connects/releases the base lever 2 and measurement lever 3 to/from the fulcrum shaft 4, a setting arm 6 for swinging the base lever 2 relatively to the fulcrum shaft 4, and a manipulating mechanism 7 for actuating the clamp mechanism 5 and setting arm 6. The zero point adjustment for the head is accomplished as described below.

Rotating a handle 8 of the manipulating mechanism 7 causes a manipulating shaft 8a to rotate, and an eccentric cam 9b fixed to the manipulating shaft 8a acts on the clamp mechanism 5 and then the fulcrum shaft 4 is unclamped. The base lever 2 and measurement lever 3 are then rotatably supported relatively to the fulcrum shaft 4. The rotation of the manipulating shaft 8a also causes a regulator plate 6a to move forward with the action of the eccentric cam 9a fixed to the manipulating shaft 8a, and to push the setting arm 6, moving the base lever 2 to the zero point position of the detector 1.

At this point, a master is placed between the contacts 3a and caught by the contacts 3a. Rotating a handle 8 again causes the clamp mechanism 5 to actuate with the action of the eccentric cam 9b, and the base lever 2 and measurement lever 3 are fastened to the fulcrum shaft 4. At the same time, the action of the eccentric cam 9a causes the regulator plate 6a to move backward, releasing the setting arm 8. This makes the head ready for measurement and completes the zero point adjustment.

Although the measuring head with the above arrangement can accomplish the zero point adjustment, it suffers from the disadvantage that it has a complex mechanism and a large number of parts, leading to cumbersome assembly and a large size of the overall head.

A measuring head 100 disclosed in Japanese Patent Application Laid-Open No. 2002-181502, as shown in FIG. 9, is rotatably provided with a base arm 114 in a head body 112 by means of a rotating support shaft 116 as the fulcrum. A swinging support shaft 136 is provided at the tip end of the base arm 114. A measurement arm 138 is swingably supported by the swinging support shaft 136, and the measurement arm 138 can be secured in a position at any angle to the swinging support shaft 136 by means of a clamp mechanism 140. A setting arm 122 is provided on the base arm 114, and pushing the setting arm 122 with a movable plate 124 causes the base arm 114 to move to the zero point position of a differential transformer 118. The zero point adjustment is accomplished by causing the base arm 114 to move to the zero point position of a differential transformer 118, and swingably supporting the measurement arm 138 relatively to the swinging support shaft 136. In this state, a master W is caught between contacts 142, and then the measurement arm 138 is secured by the clamp mechanism 140.

The measuring head with the above arrangement, however, also suffers from the disadvantage that it has a complex mechanism for the zero point adjustment, leading to cumbersome assembly and zero point adjustment.

In view of the circumstances noted above, it is an object of the present invention to provide a measuring head that facilitates the zero point adjustment and is small and simple in its construction.

SUMMARY OF THE INVENTION

In order to attain the above described object, the present invention provides a measuring head, comprising: a head body; a base lever which is mounted to the head body swingably in a measurement direction and retract direction; and a measurement lever securably and releasably mounted at a base end thereof via a clamp mechanism to a shaft portion provided on a tip end portion of the base lever, the measurement lever including a contact abutting a measured object in a tip end thereof, wherein the clamp mechanism comprises: a bearing member which is provided at a base end of the measurement lever, the bearing member having a slit portion formed therein to allow the shaft portion to be fitted therein, resiliently deforming the slit portion in a closing direction thereof allowing the bearing member to be fastened to the shaft portion; and a fastening member which is mounted to the measurement lever rotatably in an open direction and close direction, rotating the fastening member in the open direction releasing the shaft portion secured by the bearing member, and rotating the fastening member in the close direction resiliently deforming the bearing member in a closing direction of the slit portion in the bearing member to fasten the measurement lever to the shaft portion via the bearing member, the fastening member at this time using a rotating force generated in the fastening member to deflect the measurement lever by a predetermined amount.

The fastening member of the present invention is characterized in that it deflects the measurement lever by a predetermined amount when it is rotated in the close direction, so that a position where the contact abuts a master with the fastening member open will automatically be set to a predetermined amount of travel, for example the amount of front travel.

In this mechanism, with the contact abutting the master, rotating the fastening member in the close direction to fasten the bearing member to the shaft portion allows a restoring force (or a force caused by reaction) of the bearing member to transfer from the bearing member through the fastening member to the measurement lever. As a result, the measurement lever will deflect from the zero point position to a minus side, or in a direction of the amount of front travel, substantially eliminating the zero point position setting. This makes it possible to adjust the zero point position in a small and simple construction.

The "amount of travel" refers to a difference (amount of deviation) of a distance between tip ends of contacts of the measurement levers from the diameter of a master in adjusting a zero point position, and the "amount of front travel"

refers to the difference (amount of deviation) when a distance between tip ends of contacts is smaller than the diameter of a master.

Preferably, the measuring head further comprises a regulating device which regulates an amount of swing of the base lever and variably controlling an amount of travel of the measurement lever. When the measuring head with the amount of deflection (amount of travel) of the measurement lever predefined by closing operation of the fastening member is used to measure another workpiece that has a different amount of travel than that of the head, the regulating device may thus be used to regulate the amount of swing of the base lever and variably control the amount of travel. The amount of travel may thus mechanically be controlled by the regulating device, increasing flexibility of a measuring head.

Preferably, the clamp mechanism is sealed to avoid entrance of foreign matters from outside. The clamp mechanism is thus sealed to avoid the entrance of foreign matters from the outside, such as chips, abrasive particles and coolant: it is effective to maintain accuracy, extend life and avoid faulty operation, etc. of a clamp mechanism.

Preferably, the fastening member is configured to be rotated manually or through a tool. The fastening member thus has one arrangement that can manually be rotated, for example is provided with a lever portion, or another arrangement that can be rotated through a tool, for example has a hole (hexagonal hole) formed to allow a hexagonal bar spanner (hexagonal wrench) to fit therein, facilitating manipulation.

Preferably, the fastening member comprises a cam, and an engaging device is provided which holds an amount of rotation of the cam in a stepped manner. The rotation of a cam thus allows the measurement lever to deflect, and an engaging device which holds the amount of rotation of the cam in a stepped manner is provided, facilitating control of the amount of deflection of the measurement lever, i.e. variable control of the amount of travel.

BRIEF DESCRIPTION OF THE DRAWINGS

FIGS. 6(a) and 6(b) are conceptual views of a fourth embodiment of the clamp mechanism in the measuring head;

FIGS. 7(a) and 7(b) are conceptual views of a fifth embodiment of the clamp mechanism in the measuring head;

THE PREFERRED EMBODIMENTS FOR CARRYING OUT THE INVENTION

Preferred embodiments of a measuring head according to the present invention will now be described with reference to the accompanying drawings.

Figure 1:
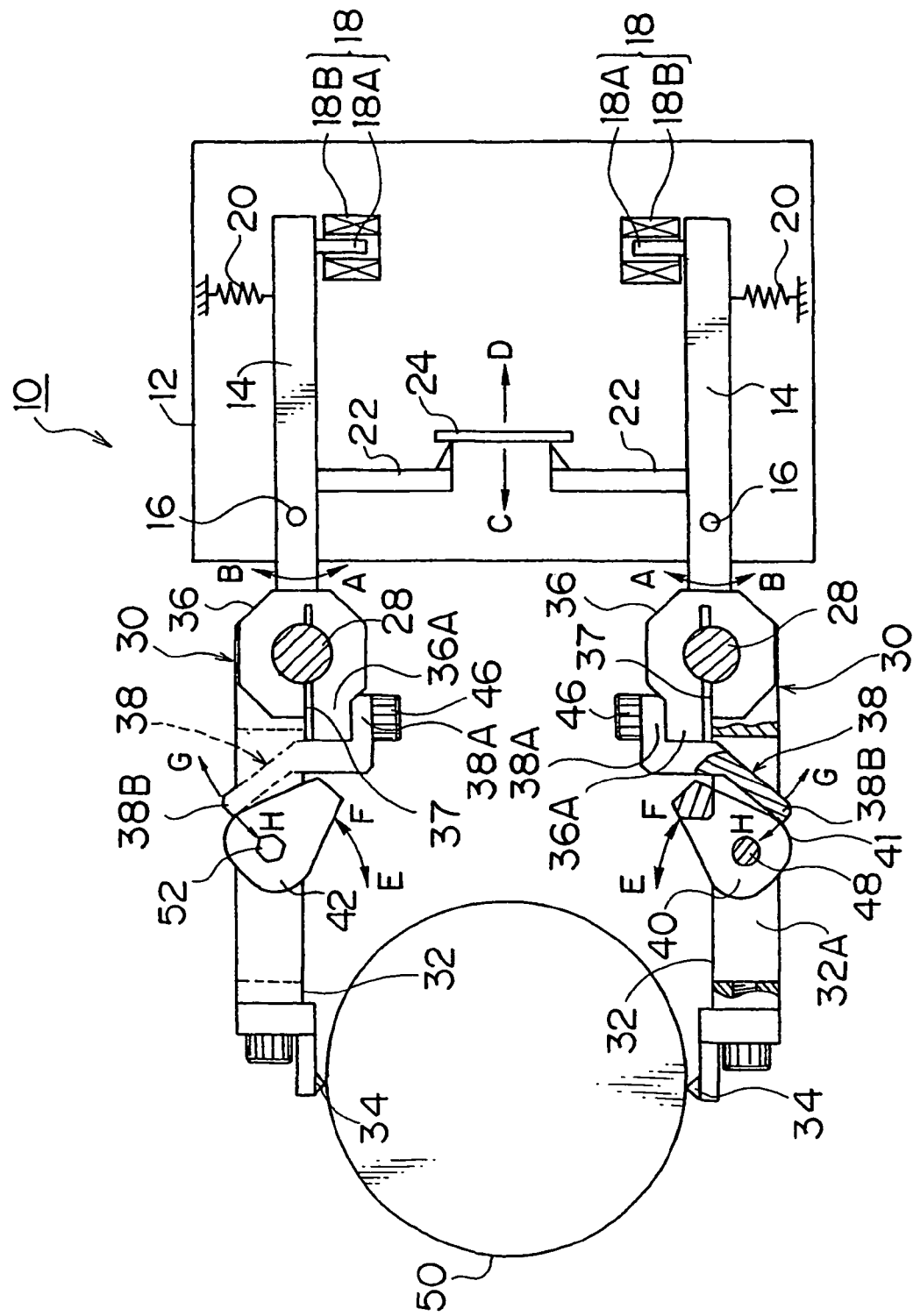
FIG. 1 is a cross-sectional side view of a measuring head applied to a gauge apparatus for measuring an outer diameter.

FIG. 1 is a side view of a measuring head 10 applied to a gauge apparatus for measuring an outer diameter. As shown in the drawing, a head body 12 formed in a rectangular box is provided with a pair of base levers 14, and these base levers 14 are provided swingably in measurement directions (directions indicated by arrows A where tip ends of base levers 14 approach each other) and retract directions (directions indicated by arrows B where the tip ends of base lever 14 leave away from each other) about a supporting shaft 16 provided in the head body 12.

Each base end of the base lever 14 is provided with a differential transformer 18 for detecting variations of the base lever 14. The differential transformer 18 is composed of a core 18A and a bobbin 18B, and the core 18A is attached to a base end of the base lever 14 and the bobbin 18B is attached to the head body 12.

A spring 20 is mounted near the base end of the base lever 14. The base lever 14 is biased in the directions indicated by the arrows A, or the measurement directions, by biasing force of the spring 20.

A setting arm 22 is mounted on the base lever 14, and the setting arm 22 abutting a regulator plate (a regulating device) 24 causes the regulator plate 24 to regulate the amount of swing of the base lever 14.

A nut portion 26 is formed at a tip end of the base lever 14, and the nut portion 26 is provided with a swinging support shaft (shaft part) 28.

A measurement lever 32 is swingably provided to the swinging support shaft 28 via the clamp mechanism 30 of a first embodiment. A contact 34 is mounted at a tip end of the measurement lever 32, and the contact 34 is abutted against a workpiece 50, which is a measured object, for measuring the outer diameter of the workpiece 50.

The clamp mechanism 30 is composed of a bearing member 36, an arm 38, a cam plate 40 or a fastening member, a lever 42, and the like. Although the lever 42 and cam plate 40 use substantially identical shapes in FIG. 2, a lever 42 in other shape may also be used.

Figure 2:
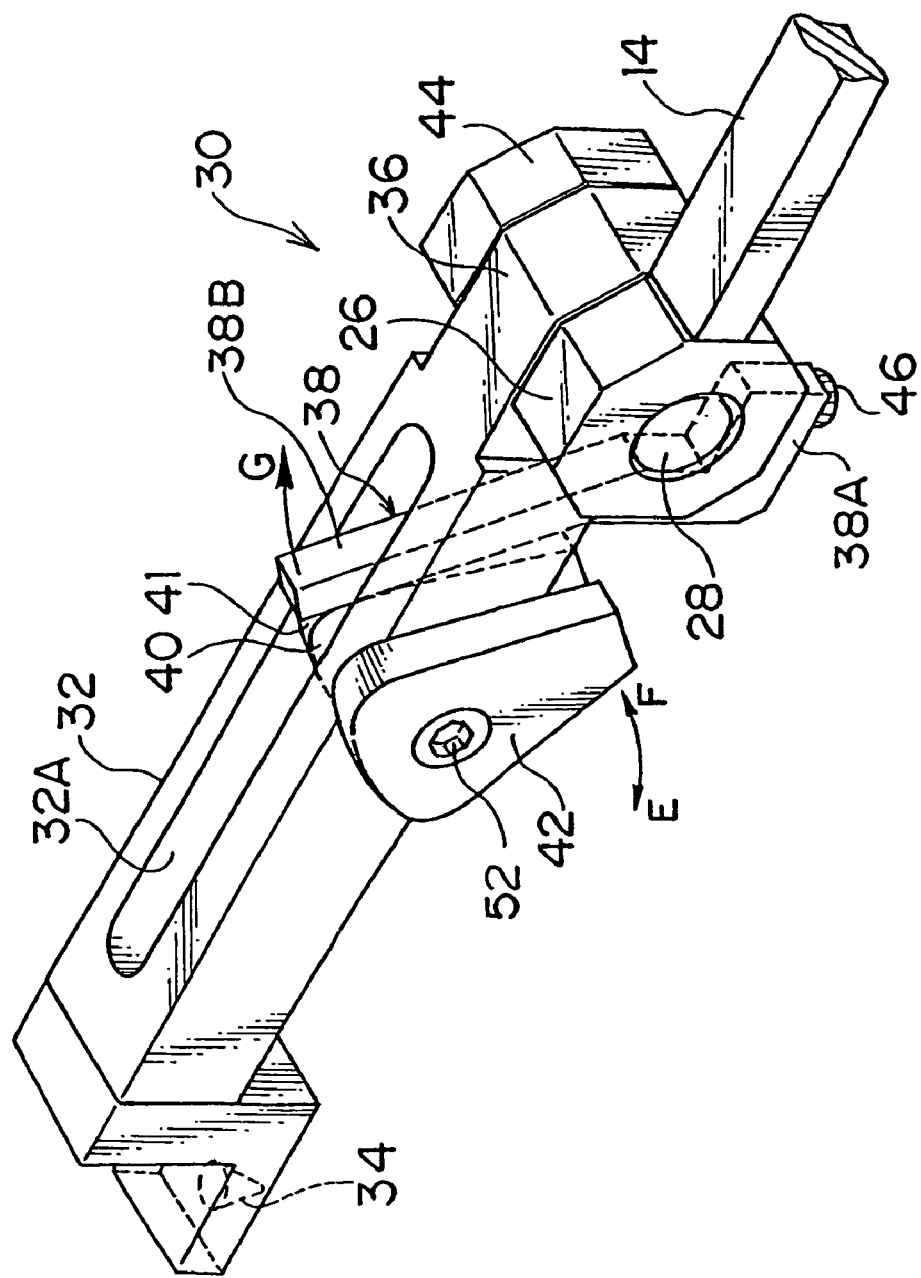
FIG. 2 is a perspective view of a first embodiment of a clamp mechanism in the measuring head shown in FIG. 1.

The bearing member 36 is a bearing that allows the swinging support shaft 28 to rotatably fit therein, as shown in FIG. 1, and is formed at an base end of the measurement lever 32 and has a slit portion 37 formed therein. The bearing member 36 is fastened to the swinging support shaft 28 by resiliently deforming the slit portion 37 in a closing direction thereof. This unrotatably secures the measurement lever 32 to the base lever 14. Additionally, the bearing member 36 is held by and between the nut portion 26 and nut portion 44 each of which the swinging support shaft 28 is attached thereto in the ends, as shown in FIG. 2, and slides on the nut portion 26 and nut portion 44 through a seal member so that it avoids the entrance of chips, abrasive particles, coolant and the like into the bearing member 36 during measurements of a workpiece, i.e. during processing of the workpiece.

Figure 3:
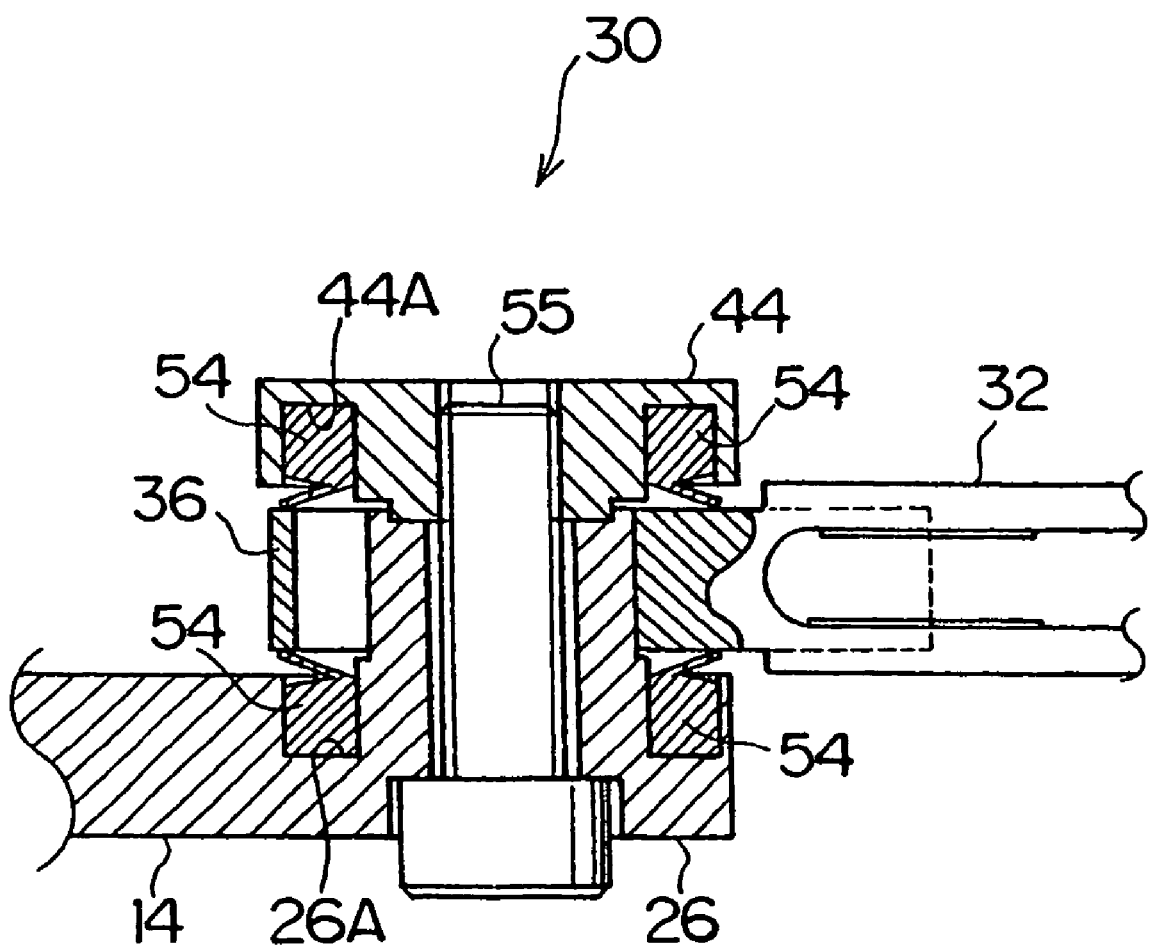
FIG. 3 is an enlarged cross-sectional view of a main part illustrating an arrangement of the clamp mechanism.

FIG. 3 is an enlarged cross-sectional view of a main part of the clamp mechanism illustrating this arrangement. Circumferential grooves 26A, 44A are formed on a side opposing the bearing member 36 of the nut portion 26 and nut portion 44, respectively, and annular seal members 54, 54 are arranged in the grooves 26A, 44A to press either side of the bearing member 36. The seal member 54 has a V-shape in the cross-section, and the cross-sectional shape presses the either side of the bearing member 36, enhancing sealing performance. Typical O-rings, however, may be used to obtain the similar effects.

The seal member 54 uses super hard nitrile rubber as the material. However, other materials such as chloroprene rubber, silicone rubber and the like may be used.

For sealing the clamp mechanism 30, whatever blocks an entering path of foreign matters from the outside is preferably provided in addition to the seal member 54. Specifically, the slit portion 37 in the bearing member 36 (see FIG. 1) may be filled with, for example, silicone sealant. Such a silicone sealant, etc. may retain flexibility after it is cured and will not inhibit the slit portion 37 to close.

In FIG. 3, the nut portion 26 is integral with the base lever 14 and has a through-hole that is not threaded inside, as opposed to the arrangement in FIG. 2. Additionally, a headed bolt 55 is used to fasten the clamp mechanism 30.

The arm 38 is fastened in the base 38A thereof by a bolt 46 to a protrusion 36A formed near the slit portion 37 in the bearing member 36, as shown in FIG. 1. A tip end 38B of the arm 38 is inserted in a slit 32A opened in a longitudinal direction of the measurement lever 32.

The cam plate 40 is rotatably supported in the slit 32A through a shaft 48, and also supported through the shaft 48 by the lever 42 located at a side of the measurement lever 32. Additionally, a hexagonal hole 52 is formed coaxially with the shaft 48 in the lever 42. This hexagonal hole 52 can be fitted with a hexagonal wrench for rotating the lever 42 in both an open direction indicated by an arrow E and a close direction indicated by an arrow F. A tool for rotating the lever 42 is not limited to a hexagonal wrench.

Rotating the lever 42 in a close direction indicated by an arrow F causes a protruding surface 41 in the cam surface formed around the cam plate 40 to press the tip end 38B of the arm 38 in a direction indicated by an arrow G. This resiliently deforms the bearing member 36 in a closing direction of the slit portion 37, fastening the bearing member 36 to the swinging support shaft 28 and also the measurement lever 32 to the base lever 14.

In the mechanism of the clamp mechanism 30 of the first embodiment, rotating the cam plate 40 to fasten the bearing member 36 to the swinging support shaft 28 allows a restoring force (or a force caused by reaction) of the bearing member 36 to transfer from the bearing member 36 through the arm 38, cam plate 40 and shaft 48 to the measurement lever 32. The restoring force works from the arm 38 to the cam plate 40 in a direction indicated by an arrow H in FIG. 1, so that the measurement lever 32 deflects from the zero point position to a minus side, or in a direction of the amount of front travel. The amount of deflection is designed to deflect by an amount that equals to or exceeds the amount of front travel through a strength calculation using a restoring force of the bearing member 36, a rigidity of the arm 38, a rigidity of the measurement lever 32 and the like as the parameters.

How the measuring head 10 arranged as described above sets the zero point adjustment will now be described.

In FIG. 1, the setting arm 22 abuts the regulator plate 24, regulating the swing of the base lever 14. With the lever 42 placed in an open position shown by a solid line in FIG. 1, contacts 34, 34 are abutted against a master 50. Data outputted from the differential transformer 18 in the measuring head 10 at this time indicates the amount of front travel. The clamp mechanism 30 of the embodiment is characterized in that it deflects the measurement lever 32 by an amount that equals to the amount of front travel when the lever 42 is rotated in the close direction, and therefore only allowing the contact 34 to abut the master 50 with the lever 42 open will automatically set the amount of front travel. The reason for this will be apparent from the description blow.

Then, rotating the lever 42 in a direction indicated by an arrow F, or a close position, with the contact 34 abutting the master 50 causes the bearing member 36 to be fastened to the swinging support shaft 28 as described above. At this time, a restoring force (or a force caused by reaction) of the bearing member 36 transferred from the bearing member 36 through the arm 38, cam plate 40 and shaft 48 to the measurement lever 32 causes the measurement lever 32 to deflect by an amount that equals to the amount of front travel. This deflection then causes the measurement lever 32 to deflect to the zero point position from the position described above where the amount of front travel is set, substantially eliminating the need of the zero point position setting. The zero point position setting is therefore facilitated according to the clamp mechanism 30.

Since the amount of front travel is set according to a measured workpiece 50, when another workpiece that is defined to have a different amount of travel than that predefined to the measuring head 10 is to be measured, the position of the regulator plate 24 is changed to regulate the amount of swing of the base lever 14 for adjusting the amount of front travel. The regulator plate 24 is attached to a micrometer, which is not shown, provided to the head body 12, and may be moved in directions indicated by arrows C and D relatively to the head body 12 by operating the micrometer.

The position of the regulator plate 24 is thus changed relatively to the setting arm 22, and then the amount of swing of the base lever 14 is regulated, so that the amount of front travel defined to the measuring head 10 can be changed. This increases flexibility of a measuring head 10.

Although the amount of front travel depends on the type of a system, applications and the like, typically a value on the order of 0.2 mm is preferably used. A value on the order of 0.12 mm, however, is preferably used to measure a discontinuous surface such as a gear. An arrangement that can change the amount of travel is not limited to one described above, and it is achieved with other arrangements described below in FIGS. 5(a) and 5(b), as well as FIGS. 6(a) and 6(b).

Figure 4:
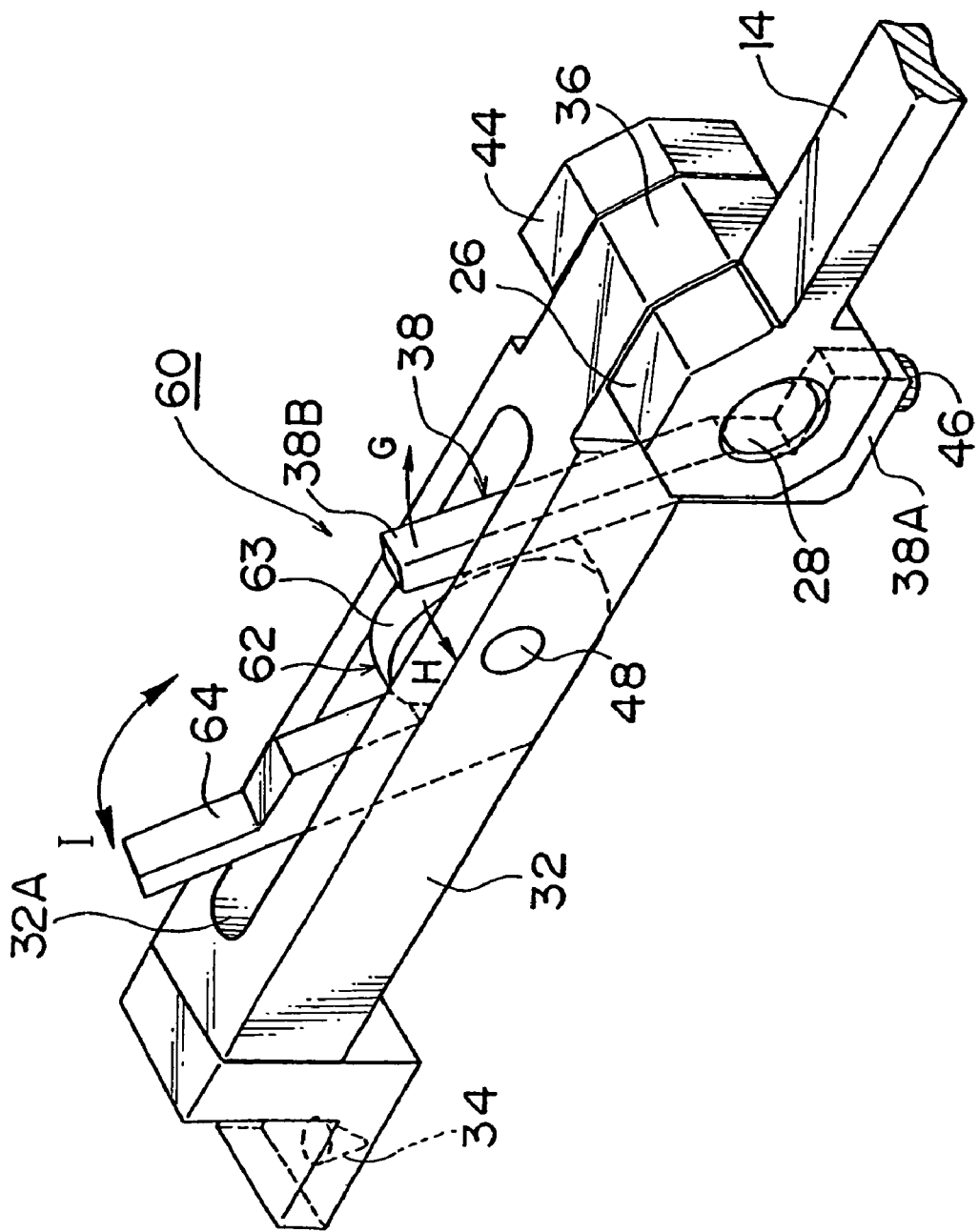
FIG. 4 is a perspective view of a second embodiment of the clamp mechanism in the measuring head.

FIG. 4 is a perspective view illustrating the construction of the clamp mechanism 60 of a second embodiment. Similar members to those of the clamp mechanism 30 of the first embodiment as shown in FIG. 2 will be shown with the like references and will not be described in any detail.

The clamp mechanism 60 shown in FIG. 4 integrates a cam plate 62 with a lever 64. Rotating the lever 64 in a close direction indicated by an arrow I causes a protruding surface 63 in the cam surface formed around the cam plate 62 to press the tip end 38B of the arm 38 in a direction indicated by an arrow G. This resiliently deforms the bearing member 36 in a closing direction of the slit portion 37 in the bearing member 36 (see FIG. 1), fastening the bearing member 36 to the swinging support shaft 28 and also the measurement lever 32 to the base lever 14.

In the mechanism of the clamp mechanism 60 of the second embodiment, rotating the cam plate 62 to fasten the bearing member 36 to the swinging support shaft 28 allows a restoring force (or a force caused by reaction) of the bearing member 36 to transfer from the bearing member 36 through the arm 38, cam plate 62 and shaft 48 to the measurement lever 32. The restoring force works from the arm 38 to the cam plate 62 in a direction indicated by an arrow H in FIG. 4, so that the measurement lever 32 deflects by an amount that equals to the amount of front travel.

In a measuring head having the clamp mechanism 60 of the second embodiment, therefore, the zero point position is automatically set by fastening the lever 64, facilitating the zero point position setting.

Figures 5A, 5B:
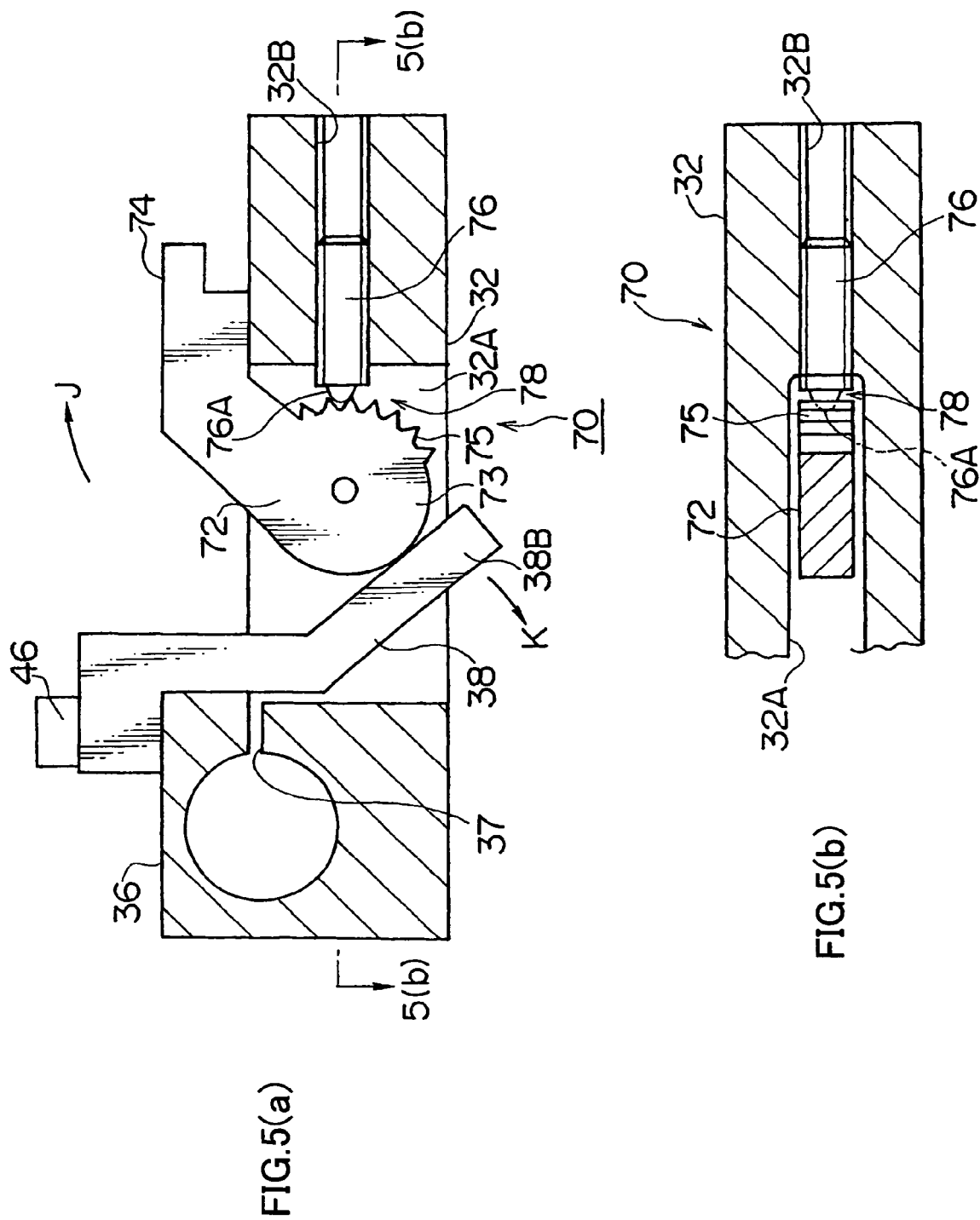
FIGS. 5(a) and 5(b) are conceptual views of a third embodiment of the clamp mechanism in the measuring head.
Figure 8:
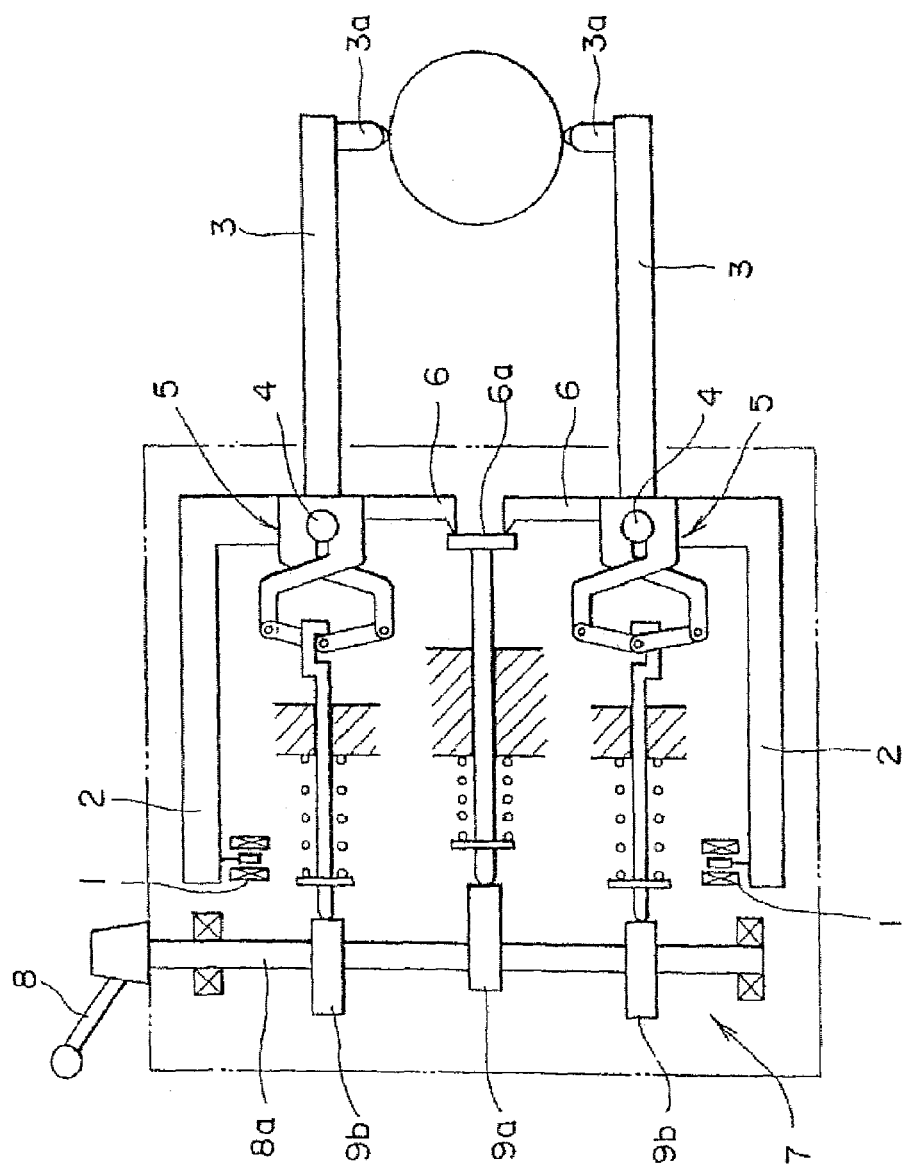
FIG. 8 is a cross-sectional view illustrating a construction of a conventional measuring head.
Figure 9:
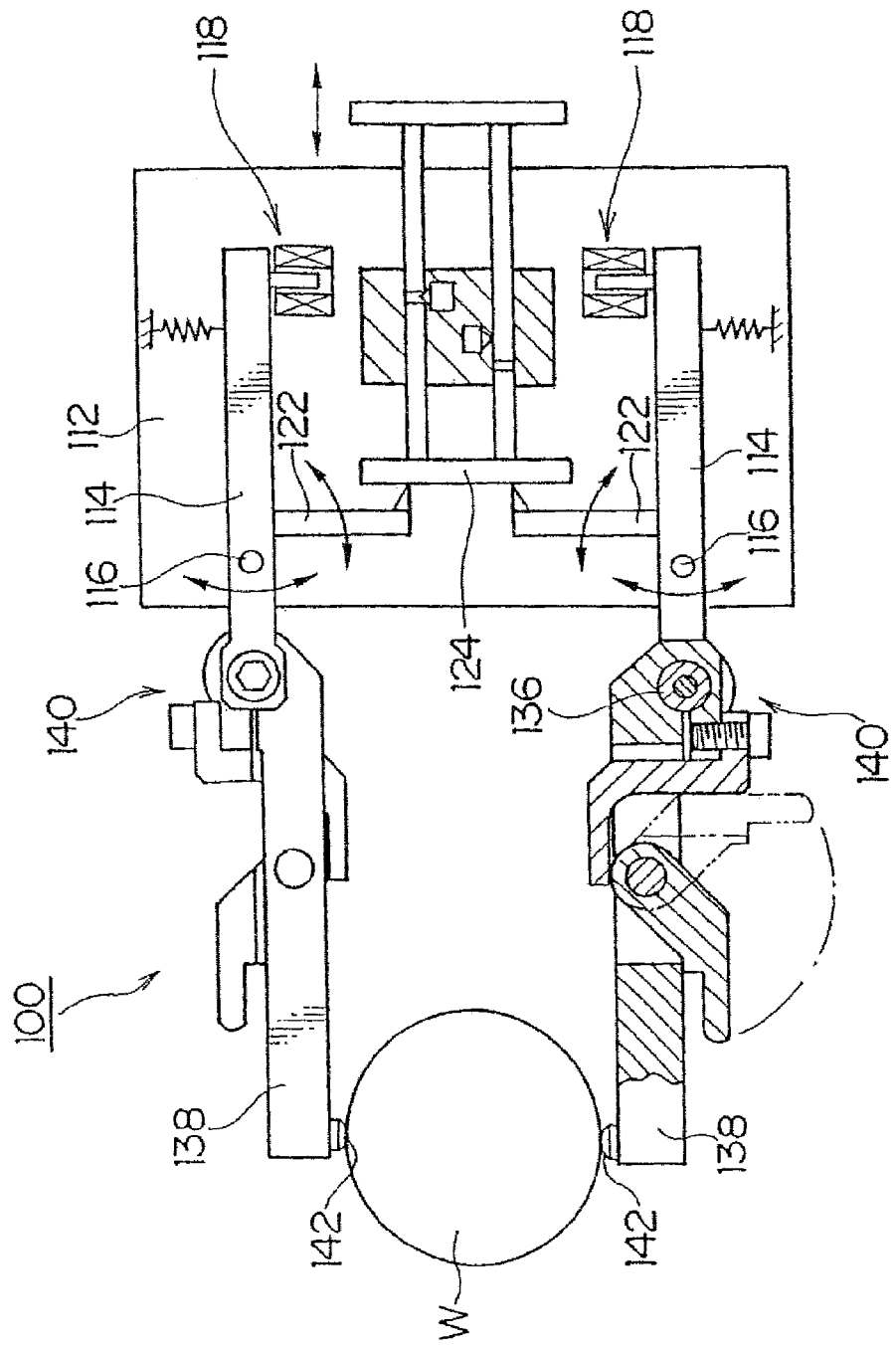
FIG. 9 is a cross-sectional view illustrating a construction of a conventional measuring head.

FIG. 5(a) is a conceptual view illustrating a construction of a clamp mechanism 70 of a third embodiment, and FIG. 5(b) is a cross-sectional view taken along the line 5(b)-5(b) in FIG. 5(a). Similar members to those of the clamp mechanism 30 of the first embodiment as shown in FIG. 2 will be shown with the like references and will not be described in any detail.

The clamp mechanism 70 shown in FIGS. 5(a) and 5(b) integrates a cam plate 72 with a lever 74. Rotating the lever 74 in a close direction indicated by an arrow J causes a protruding surface 73 in the cam surface formed around the cam plate 72 to press the tip end 38B of the arm 38 in a direction indicated by an arrow K. This resiliently deforms the bearing member 36 in a closing direction of the slit portion 37 in the bearing member 36, fastening the bearing member 36 to the swinging support shaft 28 (see FIG. 1) and also the measurement lever 32 to the base lever 14.

In the clamp mechanism 70 of the third embodiment, the effect of facilitating the zero point position setting by means of the measurement lever 32 deflected by an amount that equals to the amount of front travel is substantially the same as that of the first and second embodiments, and will not be described in any detail.

The third embodiment is characterized by the arrangement in that the fastening member comprises a cam plate, and an engaging device which holds the amount of rotation of the cam plate in a stepped manner is provided. The engaging device 78 is composed of a gear-shaped portion 75 formed on a peripheral surface of the cam plate 72, and a ball plunger 76 fastened to the measurement lever 32.

Specifically, the engaging device 78 is arranged as described below. A through-hole 32B is provided from an end surface of a tip end of the measurement lever 32, and a female screw is provided in the through-hole 32B. The ball plunger 76 that is circumferentially provided with a male screw for screwing into the female screw is screwed into the through-hole 32B in a tip end of the measurement lever 32, and positioned to engage the gear-shaped portion 75 of the cam plate 72 in the tip thereof.

The ball plunger 76 has a retractable ball 76A biased by a spring, which is not shown, in a protruding direction, and regulates the rotation of the cam plate 72 with the ball 76A fitted between teeth of the gear-shaped portion 75. The force of the regulation, however, is not too strong, and a rotational torque more than a predetermined value will invalidate the regulation of rotation.

The engaging device 78 with an arrangement described above may hold the amount of rotation of the cam plate 72 in a stepped manner. The cam plate 72 is formed such that the diameter of the peripheral surface thereof gradually alters, and changing the amount of rotation of the cam plate 72 in a stepped manner allows the pressure of the arm 38 to change in a stepped manner, so that the amount of travel defined to the measuring head 10 can be changed.

FIG. 6(a) is a conceptual view illustrating a construction of a clamp mechanism 80 of a fourth embodiment, and FIG. 6(b) is a cross-sectional view taken along the line 6(b)—6(b) in FIG. 6(a). Similar members to those of the clamp mechanism 30 of the first embodiment as shown in FIG. 2 will be shown with the like references and will not be described in any detail.

The clamp mechanism 80 shown in FIGS. 6(a) and 6(b) integrates a cam plate 82 with a lever 84. Rotating the lever 84 in a close direction indicated by an arrow L causes a protruding surface 83 in the cam surface formed around the cam plate 82 to press the tip end 38B of the arm 38 in a direction indicated by an arrow M. This resiliently deforms the bearing member 36 in a closing direction of the slit portion 37 in the bearing member 36, fastening the bearing member 36 to the swinging support shaft 28 (see FIG. 1) and also the measurement lever 32 to the base lever 14.

In the clamp mechanism 80 of the fourth embodiment, the effect of facilitating the zero point position setting by means of the measurement lever 32 deflected by an amount that equals to the amount of front travel is substantially the same as that of the first and second embodiments, and will not be described in any detail.

The fourth embodiment, as similar to the third embodiment, is characterized by the arrangement in that the fastening member comprises a cam plate, and an engaging device which holds the amount of rotation of the cam plate in a stepped manner is provided. The engaging device 88 is composed of a plurality of recesses 85 formed on a surface of the cam plate 82, and a ball plunger 86 fastened to the measurement lever 32.

Specifically, the engaging device 88 is arranged as described below. A through-hole 32C is provided from a side of the measurement lever 32, and a female screw is provided in the through-hole 32C. The ball plunger 86 that is circumferentially provided with a male screw for screwing into the female screw is screwed into the through-hole 32C in the measurement lever 32, and positioned to engage the recess 85 of the cam plate 82 in the tip thereof.

The ball plunger 86 has a retractable ball 86A biased by a spring, which is not shown, in a protruding direction, and regulates the rotation of the cam plate 82 with the ball 86A fitted into the recess 85. The force of the regulation, however, is not too strong, and a rotational torque more than a predetermined value will invalidate the regulation of rotation.

The engaging device 88 with an arrangement described above may hold the amount of rotation of the cam plate 82 in a stepped manner. The cam plate 82 is formed such that the diameter of the peripheral surface thereof gradually alters, and changing the amount of rotation of the cam plate 82 in a stepped manner allows the pressure of the arm 38 to change in a stepped manner, so that the amount of travel defined to the measuring head 10 can be changed.

FIG. 7(a) is a conceptual view illustrating a construction of a clamp mechanism 90 of a fifth embodiment, and FIG. 7(b) is a cross-sectional view taken along the line 7(b)—7(b) in FIG. 7(a). Similar members to those of the clamp mechanism 30 of the first embodiment as shown in FIG. 2 will be shown with the like references and will not be described in any detail.

The fifth embodiment is characterized by the arrangement in that the fastening member 91 comprises a cam plate 92, etc., and the fastening member 91 is not protruding out of the measurement lever 32. The clamp mechanism 90 as shown in FIGS. 7(a) and 7(b) is composed of a fastening member 91 having the cam plate 92, and the arm 38, etc.

The fastening member 91 comprises the cam plate 92, a shaft 94 that passes through and is integrated with the cam plate 92, and a pin 95 that passes through the cam plate 92 and the shaft 94 and integrates them. A hexagonal hole 94A is formed coaxially with the shaft 94 in both sides of the shaft 94. This hexagonal hole 94A can be fitted with a hexagonal wrench for rotating the fastening member 91 both clockwise and counterclockwise. A tool for rotating the fastening member 91 is not limited to a hexagonal wrench.

Through-holes 32D, 32D are provided in both sides of the measurement lever 32, and the shaft 94 of the fastening member 91 is rotatably secured in the through-holes 32D, 32D via dry bearings 96, 96. The dry bearings 96, 96 are press fitted into the through-holes 32D, 32D. The above arrangement allows the measurement lever 32, the shaft 94 of the fastening member 91, and the dry bearing 96 to be substantially flush with each other, creating flat appearance without protrusions outside the measurement lever 32.

In the clamp mechanism 90 of the fifth embodiment, the effect of facilitating the zero point position setting by means of the measurement lever 32 (see FIG. 1) deflected by an amount that equals to the amount of front travel is substantially the same as that of the first and second embodiments, and will not be described in any detail.

Each example of embodiments of a measuring head according to the present invention has been described, the present invention is not limited to the above exemplary embodiments, and various aspects may be possible.

For example, although clamp mechanisms of a measuring head applied to a gauge apparatus for measuring an outer diameter has been described in the embodiments, they are not limitative and may be applied to a gauge apparatus for measuring an inner diameter. In the case of this measuring head, a clamp mechanism may be designed so that the measurement lever deflects to a plus side relatively to the zero point because the amount of front travel is set in this direction.

Additionally, various aspects such as a combination of each example of the embodiments may be possible. For example, an aspect may be possible such that it combines an arrangement without protrusions outside the measurement lever 32 that is used in the fifth embodiment as shown in FIGS. 7(*a*) and 7(*b*), and the clamp mechanism 80 that is used in the fourth embodiment as shown in FIGS. 6(*a*) and 6(*b*).

INDUSTRIAL APPLICABILITY

As described above, the fastening member of the present invention is characterized in that it deflects the measurement lever by a predetermined amount when it is rotated in the close direction, so that a position where the contact abuts a master with the fastening member open will automatically be set to a predetermined amount of travel, for example the amount of front travel. In this mechanism, with the contact abutting the master, rotating the fastening member in the close direction to fasten the bearing member to the shaft portion allows a restoring force (or a force caused by reaction) of the bearing member to transfer from the bearing member through the fastening member to the measurement lever. As a result, the measurement lever will deflect from the zero point position to a minus side, or in a direction of the amount of front travel, substantially eliminating the need of the zero point position setting. This makes it possible to adjust the zero point position in a small and simple construction.

The invention claimed is:

1. A measuring head, comprising:
   a head body;
   a base lever which is mounted to the head body swingably in a measurement direction and retract direction; and
   a measurement lever securably and releasably mounted at a base end thereof via a clamp mechanism to a shaft portion provided on a tip end portion of the base lever, the measurement lever including a contact abutting a measured object in a tip end thereof,
   wherein the clamp mechanism comprises:
   a bearing member which is provided at a base end of the measurement lever, the bearing member having a slit portion formed therein to allow the shaft portion to be fitted therein, resiliently deforming the slit portion in a closing direction thereof allowing the bearing member to be fastened to the shaft portion; and
   a fastening member which is mounted to the measurement lever rotatably in an open direction and close direction, rotating the fastening member in the open direction releasing the shaft portion secured by the bearing member, and rotating the fastening member in the close direction resiliently deforming the bearing member in a closing direction of the slit portion in the bearing member to fasten the measurement lever to the shaft portion via the bearing member, the fastening member at this time using a rotating force generated in the fastening member to deflect the measurement lever by a predetermined amount.

2. The measuring head as defined in claim 1, further comprising a regulating device which regulates an amount of swing of the base lever and variably controlling an amount of travel of the measurement lever.

3. The measuring head as defined in claim 1, wherein the clamp mechanism is sealed to avoid entrance of foreign matters from outside.

4. The measuring head as defined in claim 1, wherein the fastening member is configured to be rotated manually or trough a tool.

5. A measuring head comprising:
   a head body:
   a base lever which is mounted to the head body swingably in a measurement direction and refract direction; and
   a measurement lever securably and releasably mounted at a base end thereof via a clamp mechanism to a shaft portion provided on a tip end portion of the base lever, the measurement lever including a contact abutting a measured object in a ti end thereof
   wherein the clamp mechanism comprises:
   a bearing member which is provided at a base end of the measurement lever, the bearing member having a slit portion formed therein to allow the shaft portion to be fitted therein, resiliently deforming the slit portion in a closing direction thereof allowing the bearing member to be fastened to the shaft portion; and
   a fastening member which is mounted to the measurement lever rotatably in an open direction and close direction, rotating the fastening member in the open direction releasing the shaft portion secured by the bearing member and rotating the fastening member in the close direction resiliently deforming the bearing member in a closing direction of the slit portion in the bearing member to fasten the measurement lever to the shaft portion via the bearing member, the fastening member at this time using a rotating force generated in the fastening member to deflect the measurement lever b a redetermined amount.
   wherein the fastening member comprises a cam, and an engaging device is provided which holds an amount of rotation of the cam in a stepped manner.

6. A measuring head, comprising:
   a head body;
   a base lever which is mounted to the head body swingably in a measurement direction and refract direction; and a measurement lever securably and releasably mounted at a base end thereof via a clamp mechanism to a shaft portion provided on a tip end portion of the base lever, the measurement lever including a contact abutting a measured object in a tip end thereof, wherein the clamp mechanism comprises:

a bearing member which is provided at a base end of the measurement lever, the bearing member having a slit portion formed therein to allow the shaft portion to be fitted therein, resiliently deforming the slit portion in a closing direction thereof allowing the bearing member to be fastened to the shaft portion; and a fastening member comprising a cam plate, which is mounted to the measurement lever rotatably in an open direction and close direction, rotating the cam plate in the open direction releasing the shaft portion secured by the bearing member, and rotating the cam plate in the close direction resiliently deforming the bearing member in a closing direction of the slit portion in the bearing member to fasten the measurement lever to the shaft portion via the bearing member, the fastening member at this time using a rotating force generated in the fastening member to deflect the measurement lever by a predetermined amount.

7. The measuring head as defined in claim 6, further comprising a regulating device which regulates an amount of swing of the base lever and variably controlling an amount of travel of the measurement lever.

8. The measuring head as defined in claim 6, wherein the clamp mechanism is sealed to avoid entrance of foreign matters from outside.

9. The measuring head as defined in claim 6, wherein the fastening member is configured to be rotated manually or through a tool.

* * * * *